UNITED STATES PATENT OFFICE.

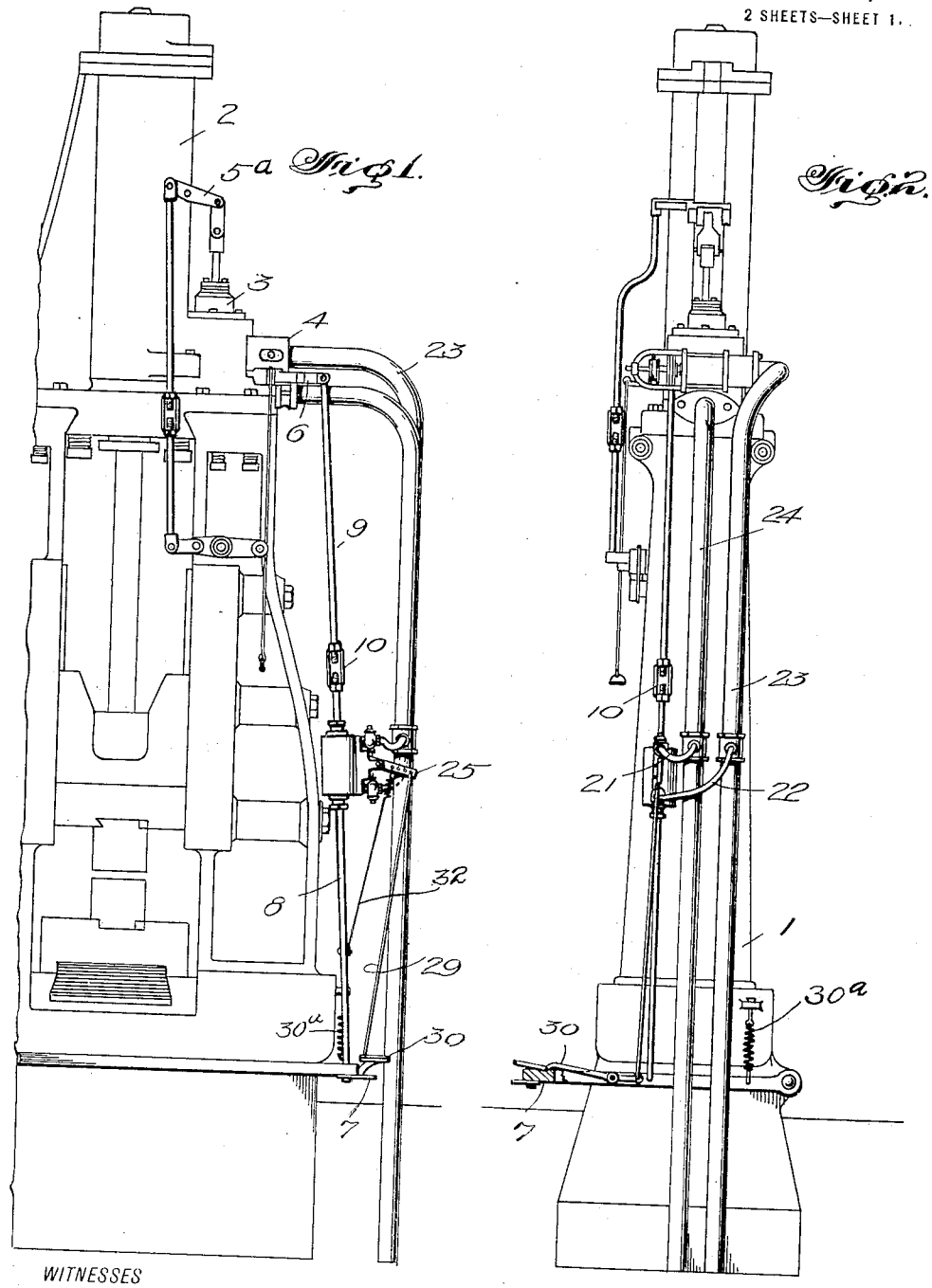

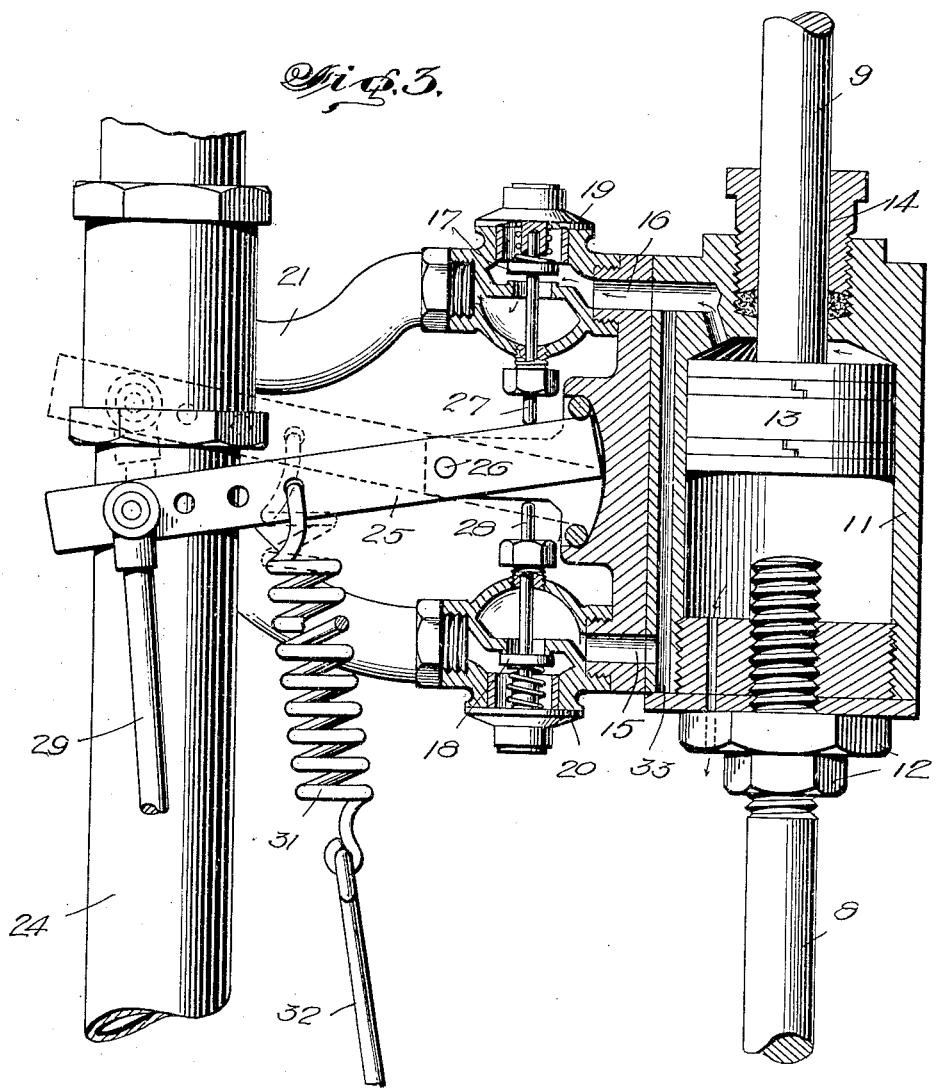

MYRON E. TIBBELS, OF FREMONT, OHIO.

STEAM-HAMMER ATTACHMENT.

1,330,922.

Specification of Letters Patent.   Patented Feb. 17, 1920.

Application filed April 26, 1917.   Serial No. 164,604.

*To all whom it may concern:*

Be it known that I, MYRON E. TIBBELS, a citizen of the United States, and a resident of Fremont, in the county of Sandusky and State of Ohio, have invented new and useful Improvements in Steam-Hammer Attachments, of which the following is a specification.

My invention is an improvement in steam hammer attachments, and has for its object to provide in an apparatus of the character specified, a simple and efficient means controllable from the operating treadle, for closing the throttle when the treadle is released, and for opening the throttle to working position prior to the beginning of the downward movement of the treadle, to limit the unnecessary consumption of motive fluid while waiting for a heat or any other purpose.

In the drawings:

Figure 1 is a side view of a portion of a steam hammer provided with the improvement, Fig. 2 is a side view, Fig. 3 is an enlarged sectional view of the attachment.

The present embodiment of the invention is shown in connection with a steam hammer 1, wherein the motive fluid is controlled by a valve 3 which regulates the admission of the motive fluid to the opposite ends of the cylinder. This valve is the usual piston or slide valve, and a valve 4 which is the throttle valve, controls the admission of the motive fluid.

This valve 4, in the usual practice, is never entirely closed, so that when waiting for a heat or for any other purpose, the hammer will still reciprocate, but without striking. The action is similar to that of a saw mill where the saw rotates at all times, the supply of motive fluid and the speed being increased or diminshed by the sawyer in accordance with conditions. In the same manner the hammer-man by means of the throttle valve controls the force of the blow. To cut off the steam in the usual practice, it is necessary to pass around to the rear of the hammer to the main steam valve.

A lever is connected to the valve 3, and suitable controlling mechanism indicated at 5ᵃ is connected with the lever for controlling the valve. The said mechanism is old and well known, and for that reason not further described.

The valve 4 is controlled by a treadle 7. The valve 4 has an arm or lever 6 connected therewith, and a sectional rod or link 8—9 connects the arm or lever to the treadle. The lower section 8 of the rod is connected at its lower end to the treadle, and the upper section 9 is connected at its upper end to the lever 6, and a turn buckle 10 is interposed in the length of this section.

The attachment comprises a cylinder 11 to which the upper end of the lower section 8 of the link 8—9 is connected. The said link has a threaded engagement with the cylinder and is provided with lock nuts 12 for preventing accidental disengagement. The lower end of the upper section 9 of the link is connected to a piston 13 within the cylinder, the said lower end of the link passing through a stuffing box 14 in the cylinder. The cylinder has inlet and outlet ports 15 and 16 respectively, and the said ports are controlled by valves 17 and 18, mounted in suitable casings 19 and 20 connected with the cylinder at the ports.

The valves are normally spring held in closed position, as shown, and the casings 19 and 20 communicate by means of flexible pipes 21 and 22 with the air line 23 and the waste or exhaust line 24 respectively. The arrangement is such that when the valve 18 is opened, fluid under pressure will be admitted to the upper end of the cylinder to move the piston downwardly, thus shortening the link 8—9.

The valves 17 and 18 are controlled by a lever 25 pivoted at 26 to an extension from the cylinder. One end of the lever moves between the stems 27 and 28 of the valves 17 and 18, opening the valve 18 when the said end of the lever swings downwardly, and opening the valve 17 when the said end swings upwardly. A link 29 connects the other end of the lever with an auxiliary treadle 30 arranged just above the treadle 7, in such manner that the treadle 30 will be operated by the foot of the operator before the treadle 7 is operated.

A coil spring 31 acts normally to return the lever 25 to normal position, that is, to the full line position of Fig. 3, and the spring is connected with the portion 8 of the link 8—9 by a rod 32.

Without the employment of the attachment, under normal working conditions, the connection 8—9—10 is suitably adjusted to normally retain the throttle valve open.

When the treadle is depressed, the throttle is opened to a greater extent, and the control valve is moved to admit pressure on top of the piston to force it downwardly. With this construction it is apparent that the foot treadle, except when depressed by pressure of the foot stands in elevated or operative position, and there is a large consumption of motive fluid, since the hammer reciprocates continuously while waiting for instance for a heat.

With the attachment however the connection 8—9 may be lengthened sufficiently to close the throttle valve with the treadle still in normal position, the said treadle being normally elevated by the springs 30ª shown. When the hammer-man relaxes pressure on the treadles 30 and 7, the treadle 30 lifts, swinging the lever 25 into the dotted line position of Fig. 3, opening the valve 18, and admitting pressure on the cylinder 11. The piston 13 is lifted and the connection 8—9 is lengthened, closing the throttle with the treadle in normal position.

At the starting the hammer-man opens the main steam valve, thus admitting pressure to the cylinder. This pressure is controlled by the valve 3, and since the auxiliary treadle 30 is lifted and the connection 8—9 is lengthened, the throttle 4 is still closed.

When however the hammer-man places his foot on the treadle 30 and depresses the same, the connection is shortened, that is, the connection 8—9 is contracted to its normal operating length so that the usual and accustomed operation of the treadle 7 by the hammer-man will produce the usual results as regards the hammer stroke. When the forging is completed or stayed for any purpose relaxation of the pressure on the treadle 30 immediately lengthens the connection, and closes the throttle. Thus it will be seen that the preliminary movement of depressing the treadle places the operating parts in normal position, while the movement of relaxing pressure on the treadle closes the throttle.

I claim:

1. In a fluid pressure controlled hammer, the combination with the throttle valve for controlling the supply of motive fluid and the treadle for operating the same, of an auxiliary treadle arranged above the controlling treadle, a link connecting the controlling treadle with the valve for operating the same when the treadle is depressed, said link being sectional, a cylinder secured to one section, a piston secured to the other section and movable in the cylinder, connections between the cylinder and the supply and exhaust pipes of the hammer, valves for controlling the connections, means for operating the valves in alternation, and a connection between the auxiliary treadle and the said operating means for admitting the fluid under pressure to the cylinder when the treadle is depressed and for connecting said cylinder with the exhaust when the treadle is elevated, and a spring for returning the treadle.

2. In a fluid pressure controlled hammer, the combination with the throttle valve for controlling the supply of motive fluid and the treadle for operating the same, a link connecting the controlling treadle with the valve for operating said valve when the treadle is depressed, said link being sectional, and a cylinder and piston interposed between the sections, one of the sections being secured to the piston and the other to the cylinder, connections between the cylinder and the supply and exhaust pipes of the hammer, valves for controlling the connections, means for operating the valves in alternation, and an auxiliary treadle arranged above the controlling treadle and connected with the operating means for operating the same before the controlling treadle is depressed.

3. In a fluid pressure controlled hammer, the combination with the throttle valve for controlling the supply of motive fluid and means for operating the same, said means comprising a treadle and a connection between the treadle and the valve, fluid pressure controlled means for lengthening and shortening the connection, means for controlling the supply and exhaust to the said means, and an auxiliary treadle for operating said means arranged above the first named treadle.

4. In a fluid pressure controlled hammer, the combination with the throttle valve, the treadle for controlling the valve and the connection between the treadle and the valve, of means arranged above the treadle and adapted to be operated by the foot of the hammer-man for lengthening and shortening the said connection.

MYRON E. TIBBELS.

Witnesses:
M. G. THRAVES,
FRANK H. MERRIAM.